3,457,298
PRODUCTION OF AROMATIC ESTERS
Louis Schmerling, Riverside, Ill., assignor to Universal Oil Products Company, Des Plaines, Ill., a corporation of Delaware
No Drawing. Filed Dec. 27, 1966, Ser. No. 604,578
Int. Cl. C07c 67/00, 69/78, 69/22
U.S. Cl. 260—476                                    3 Claims

ABSTRACT OF THE DISCLOSURE

Ketones can be converted into organic esters by treatment with hydrogen peroxide in the presence of hydrogen fluoride at a temperature ranging from about $-20°$ to about $60°$ C. Benzophenone can be converted to phenyl benzoate; 3-heptanone can be converted to butyl propionate and ethyl valerate. Ethyl valerate is useful as an artificial flavoring essence, phenol benzoate is an article of commerce.

---

This invention relates to a process for the production of organic esters. More particularly, the invention is concerned with a process for the treatment of a ketone with hydrogen peroxide in the presence of certain catalytic compositions of matter to prepare corresponding esters thereof.

The use of certain organic esters and particularly primary alkyl esters has become increasingly important in many and varied fields of chemistry, especially in those fields where a primary alkyl ester is desired, due to the specific physical behavior of primary esters as opposed to secondary esters. For example, primary alkyl esters will find use as intermediate in the preparation of plastics, resins, pharmaceuticals, waxes, etc. In addition, the lower esters which contain a primary alkyl portion may also be used as a fragrance in the preparation of cosmetics such as face powder, cologne, soap, perfumes, etc., said esters possessing fruit-like or flower-like aromas. Furthermore, if the ester contains a long-chain alkyl portion and is normal in configuration, the ester may be subjected to hydrolysis. Upon hydrolysis, the ester will yield a primary alcohol which, in the case of the long-chain alcohols make excellent alkylating agents for use in the preparation of biodegradable detergents. These biodegradable detergents are becoming increasingly important due to the extended use of detergents in the home and industry. Inasmuch as many of the detergents currently in use are not fully biodegradable in nature, the disposition of the detergents after use has become a problem in sewage treatment, the appearance of foam in rivers, ponds, etc., being prevalent in many areas of the country today. The non-biodegradability of these detergents is due to the fact that the alkyl side-chain of the molecule is not normal in configuration and therefore is not susceptible to action by the organisms which would ordinarily attack the molecule and destroy it, thus preventing the build-up of the aforementioned foam. However, if the alkyl side-chain of the detergent molecule is normal in configuration, it is subject to readily attack and destruction by the organisms present in the water and therefore no foam will result from the incomplete destruction of the molecule.

It is therefore an object of this invention to provide a process for the preparation of organic esters.

A further object of this invention is to provide a process for the preparation of esters by treatment of an organic ketone.

In one aspect, an embodiment of this invention resides in a process for the production of an ester which comprises reacting a ketone with hydrogen peroxide at reaction conditions in the presence of a catalyst comprising hydrogen fluoride, and recovering the resultant ester.

A specific embodiment of this invention is found in a process for the production of an ester which comprises reacting 2-octanone with hydrogen peroxide at a temperature in the range of from about $-20°$ to about $60°$ C. in the presence of hydrogen fluoride and recovering the resultant n-hexyl acetate.

Other objects and embodiments will be found in the following further detailed description of this invention.

As hereinbefore set forth, the present invention is concerned with a process for preparing organic esters. It has now been discovered that ketones may be treated with hydrogen peroxide in the presence of a liquid hydrogen fluoride catalyst at reaction conditions whereby said ketones will be converted to an organic ester. Suitable ketones which may be treated according to the process of this invention include, in particular, aliphatic ketones in which each alkyl group is a primary alkyl group, such as acetone, methyl ethyl ketone, methyl propyl ketone, diethyl ketone, 2-hexanone, 3-hexanone, 2-heptanone, 3-heptanone, 2-octanone, 3-octanone, 4-octanone, 2-nonanone, 3-nonanone, 4-nonanone, 5-nonanone, 2-decanone, 3-decanone, 4-decanone, 5-decanone, etc.

Other types of ketoes within the scope of this invention include aromatic ketones such as benzophenone, 4-benzoyltoluene, etc., aliphatic aromatic ketones such as acetophenone, propiophenone, butyrophenone, valerophenone, caprophenone, etc., 4-phenylbutyl ethyl ketone, 4-phenylpentyl benzyl ketone, etc., and cycloaliphatic ketones such as cyclopentanone, cyclohexanone, cycloheptanone, cyclooctanone, etc. Still other types of ketones which may be treated according to the process of this invention include aliphatic ketones in which one or both of the substituents does not contain a normal configuration such as methyl isopropyl ketone, methyl sec-butyl ketone, methyl tert-butyl ketone (pinacolone), ethyl isopropyl ketone, ethyl sec-butyl ketone, propyl tert-butyl ketone, etc., diisopropyl ketone (tetramethylacetone), a di-sec-butyl ketone (for example, tetraethylacetone), di-tert-butyl ketone (pivalone), etc. However, these ketones in which each alkyl group is not normal in configuration are less preferable as starting materials which are treated with hydrogen peroxide in the presence of hydrogen fluoride and will not necessarily give equivalent results when so treated. It is to be understood that the aforementioned ketones are only representative of the class of ketones which may be treated, and that the present invention is not necessarily limited thereto.

The treatment of the ketone with hydrogen peroxide in the presence of liquid hydrogen fluoride catalyst will be effected at temperatures ranging from about $-20°$ to about $60°$ C. or higher, the preferred range being approximately ambient temperature (i.e. $25°-30°$ C.). In addition, if so desired, the reaction may be effected at pressures ranging from atmospheric up to about 50 atmosphere or more, the superatmospheric pressure being provided for by the introduction of an inert gas such as nitrogen into the reaction vessel. The hydrogen peroxide which is used, will preferably comprise an aqueous solution of the peroxide containing from 90% down to 30% of hydrogen peroxide. In the preferred embodiment of the invention, the hydrogen peroxide which is used to convert the ketone to the desired ester will be used in an equimolecular amount with the ketones which are undergoing treatment.

The process of this invention may be effected in any suitable manner and may comprise either a batch or continuous type operation. For example, when a batch type operation is used, the reaction may be effected in an appropriate apparatus such as for example, a rotating or stirred autoclave. The ketone which is to undergo treatment is charged to the autoclave along with the anhydrous liquid hydrogen fluoride catalyst. Following this, the aqueous hydrogen peroxide is added gradually in an equimolecular amount to the reaction mixture. Inasmuch as the reaction is exothermic in nature, it may be necessary to maintain the temperature of the reaction vessel at the desired level by means of external cooling means such as a water bath, ice bath, etc. The mixture is stirred or rotated for a predetermined time during which the peroxide is added; this time may range from 0.5 up to about 10 hours or more. At the end of this time, the agitation is discontinued and hydrogen fluoride is purged from the reactor by means of an inert gas such as nitrogen. Upon completion of the operation, the autoclave is opened and the reaction mixture is recovered. The reaction mixture is then neutralized to remove any trace of hydrogen fluoride which may still be present and thereafter separated from the aqueous phase. The organic layer is again neutralized and subjected to fractional distillation whereby the desired ester is recovered from any unreacted starting materials and/or side products which may have formed during the reaction.

It is also contemplated within the scope of this invention that the process may be effected in a continual manner of operation. When such a type of operation is used, the ketone which is to undergo treatment is continuously charged to a reaction vessel which is maintained at the proper operating conditions of temperature and pressure. The hydrogen fluoride may be charged to the reaction vessel through a separate line or, if so desired, it may be admixed with the ketone prior to entry into said reactor and the resulting mixture is thereafter charged thereto in a single stream. In addition, the aqueous hydrogen peroxide solution is also continuously charged to the reactor through a separate line. After completing the predetermined residence time, during which the reactants are maintained in a state of continuous agitation, the reactor effluent is continuously withdrawn from the reactor and subjected to purification and separation in a manner similar to that hereinbefore set forth. The desired ester is recovered while the unreacted starting materials may be recycled to form a portion of the feed stock and any unreacted side reactions are withdrawn.

Occasionally, when a reaction temperature which lies in the upper portion of the range hereinbefore set forth or, in some instances, higher than about 60° C., that is from about 20° C. to about 60° C. is used, hydrolysis of a portion of the ester which is the reaction product of the present invention will occur, said hydrolysis yielding carboxylic acids and alcohols as the chief products thereof. In some instances, this will be a desirable reaction inasmuch as relatively long-chain aliphatic alcohols which are normal in configuration may be utilized as alkylating agents for the production of biodegradable detergents of the type hereinbefore discussed.

Examples of esters which may be prepared according to the process of this invention will include propyl acetate, butyl acetate, amyl acetate, hexyl acetate, heptyl acetate, octyl acetate, nonyl acetate, propyl propionate, butyl propionate, amyl propionate, hexyl propionate, heptyl propionate, octyl propionate, nonyl propionate, ethylbutyrate, propyl butyrate, hexyl butyrate, heptyl butyrate, ethyl valerate, propyl valerate, butyl valerate, hexyl valerate, phenyl benzoate, phenyl propionate, phenyl butyrate, phenyl valerate, phenyl caproate, ethyl benzoate, propyl benzoate, butyl benzoate, the lactone of hydroxycaproic acid, etc. It is to be understood that the aforementioned esters are only representative of the class of compounds which may be used, and that the present invention is not necessarily limited thereto.

The following examples are given to illustrate the process of the present invention which, however, are not intended to limit the generally broad scope of the present invention in strict accordance therewith.

Example I

In this experiment, a 1 liter stainless steel turbomixer autoclave was charged with 64 g. (0.5 mole) of 2-octanone and 221 g. (11.0 moles) of anhydrous hydrogen fluoride. The mixture was rapidly stirred and 50 cc. (0.5 mole) of a 30% aqueous hydrogen peroxide solution was added during a period of 1 hour. Inasmuch as the reaction is exothermic in nature, the temperature was maintained in a range of from 25° to 32° C. by use of a room temperature water bath. At the end of this 1 hour reaction period, the peroxide feed line was purged with nitrogen, following which the autoclave was purged for 2 hours with nitrogen in order to remove the hydrogen fluoride. The autoclave was opened, the red liquid reaction mixture was poured into a beaker and the apparatus was gleaned with benzene. The gleanings were added to the bulk product and the upper organic phase was decanted from the lower green aqueous layer. The organic layer was neutralized with calcium carbonate and was then distilled to remove the bulk of the solvent.

The almost solvent-free product was subjected to fractional distillation which boiled chiefly in a 150–170° C. range. The fractions were combined, treated with a sodium bisulfite solution in ethyl alcohol, this procedure being used to remove the unreacted 2-octanone. The precipitate which formed was filtered off and then was washed with ether on the filter paper to yield a filtrate which was subjected to fractional distillation. This fractional distillation yielded the desired product comprising n-hexyl alcohol (28% of the theoretical yield) and n-hexyl acetate (30% of the theoretical yield). The washed precipitate represented a recovery of 24% of the starting ketone, 2-octanone.

Example II

In this example, a mixture of 57 g. (0.5 mole) of 3-heptanone and 221 g. of (11.0 mole) of anhydrous hydrogen fluoride is placed in an autoclave similar to that described in Example I above. The mixture is stirred while 50 cc. (0.5 mole) of a 30% aqueous hydrogen fluoride solution is added thereto during a period of 1 hour. The temperature of the mixture is maintained at approximately 0–5° C. by means of an ice bath. At the end of this reaction time, the hydrogen fluoride is purged by means of a nitrogen stream and the autoclave is opened. The reaction mixture is subjected to a procedure similar to that set forth in Example I above, the desired ester products comprising ethyl valerate and butyl propionate being recovered therefrom.

Example III

To a stainless steel turbomixer autoclave is charged 91 g. (0.5 mole) of benzophenone and 221 g. (11.0 mole) of anhydrous hydrogen fluoride. The resulting mixture is stirred while 50 cc. (0.5 mole) of a 30% aqueous hydrogen peroxide solution is added thereto, the temperature of the mixture being maintained at about 25° C. by means of a water bath. Upon completion of the addition time, which is approximately 1 hour in duration, the hydrogen fluoride is stripped from the autoclave by means of a stream of nitrogen for 2 hours. At the end of this time, the autoclave is opened and the reaction mixture is decanted. The apparatus is gleaned with benzene, the gleanings added to the reaction mixture and the upper organic phase is separated from the lower aqueous phase. The organic layer is neutralized with calcium carbonate and distilled to remove a major portion of the solvent. The relatively solvent-free product is treated in a manner similar to that set forth in Example I above and the desired ester product comprising phenyl benzoate is recovered.

Example IV

In this example, a mixture of 74 g. (0.5 mole) of butyrophenone and 221 g. (11.0 moles) of anhydrous hydrogen fluoride is placed in an autoclave. Thereafter, 50 cc. (0.5 mole) of a 30% aqueous hydrogen peroxide solution is added during a period of 1 hour, while vigorously stirring the mixture. At the end of this addition time, the hydrogen fluoride is stripped from the reactor by means of a nitrogen stream. The autoclave is opened and the reaction mixture subjected to procedures similar to that set forth in Example I above. The desired esters comprising phenyl butyrate and propyl benzoate are recovered.

Example V

A mixture of 49 g. (0.5 mole) of cyclohexanone and 221 g. (11.0 mole) of anhydrous hydrogen fluoride in an autoclave is treated with 50 cc. (0.5 mole) of a 30% aqueous hydrogen peroxide solution which is added during a period of 1 hour while vigorously stirring the reaction mixture. At the end of this time, the hydrogen fluoride is stripped from the autoclave for a period of 2 hours by means of a stream of nitrogen. The autoclave is then opened and the reaction mixture decanted therefrom. After washing the apparatus with benzene and adding the benzene washings to the mixture, the upper organic phase is separated from the lower aqueous layer. The organic phase is neutralized with calcium carbonate and subjected to distillation to remove a major portion of the solvent. The almost solvent-free product is distilled, the fractions are combined and treated with sodium bisulfite and ethyl alcohol to remove unreacted cyclohexanone. The precipitate which formed is filtered off and washed with ether to yield a filtrate which is subjected to fractional distillation. The desired product comprising the lactone of 6-hydroxycaproic acid is recovered.

I claim as my invention:

1. A process for the production of an ester which comprises reacting a ketone selected from diaryl ketones and aryl n-alkyl ketones, wherein the ketone-carbonyl is directly bonded to at least one of the aryl nuclei, with hydrogen peroxide at a temperature in the range of from about −20° to about 60° C. in the presence of a catalyst comprising hydrogen fluoride, and recovering the resultant ester.

2. The process as set forth in claim 1, further characterized in that said ketone comprises benzophenone and said ester comprises phenyl benzoate.

3. The process as set forth in claim 1, further characterized in that said ketone comprises butyrophenone and said ester comprises phenyl butyrate and propyl benzoate.

References Cited

Hudlicky: Coll. Czech. Chem. Communs. 16:283–95 (1951).

HENRY R. JILES, Primary Examiner

C. M. SHURKO, Assistant Examiner

U.S. Cl. X.R.

260—343, 343.5, 476, 478, 479, 488